United States Patent [19]
Hake

[11] Patent Number: 5,133,415
[45] Date of Patent: Jul. 28, 1992

[54] CULTIVATOR SHANK ASSEMBLY
[75] Inventor: Kenneth A. Hake, Tipton, Kans.
[73] Assignee: Kent Manufacturing Co., Inc., Tipton, Kans.
[21] Appl. No.: 602,629
[22] Filed: Oct. 24, 1990
[51] Int. Cl.$^5$ ............................................. A01B 23/00
[52] U.S. Cl. ................... 172/708; 172/763; 172/773
[58] Field of Search ............. 172/142, 705, 707, 708, 172/711, 753, 763, 773

[56] References Cited

U.S. PATENT DOCUMENTS

| | | | |
|---|---|---|---|
| 224,722 | 2/1880 | Peer | 172/707 |
| 322,351 | 7/1885 | Cook | 172/707 |
| 465,173 | 12/1891 | Farguhar et al. | |
| 845,255 | 2/1907 | Omberg | |
| 1,185,498 | 5/1916 | Gooding | 172/707 |
| 1,636,048 | 7/1927 | Drefke | 172/708 |
| 1,838,355 | 12/1931 | Benjamin | |
| 2,259,890 | 10/1941 | Hipple | |
| 2,806,336 | 9/1957 | Anderson | 172/708 |
| 2,884,081 | 4/1959 | Weber | 172/708 X |
| 3,827,505 | 8/1974 | Sosalla | 172/707 |
| 3,896,883 | 7/1975 | Howes | 172/707 |
| 3,921,726 | 11/1975 | Corner et al. | 172/646 |
| 3,921,727 | 11/1975 | Anderson et al. | 172/708 |
| 4,011,915 | 3/1977 | Anderson | 172/265 |
| 4,050,524 | 9/1977 | Hake | 172/707 |
| 4,079,790 | 3/1978 | Guttler | 172/707 X |
| 4,452,320 | 6/1984 | Meiners | 172/708 |
| 4,465,396 | 8/1984 | Meinert et al. | 403/395 |

FOREIGN PATENT DOCUMENTS

| | | | |
|---|---|---|---|
| 20686 | 6/1930 | Australia | 172/707 |
| 40509 | 7/1929 | Denmark | 172/708 |
| 2352262 | 6/1975 | Fed. Rep. of Germany | 172/711 |

OTHER PUBLICATIONS

"Two Piece K-Flex Shank Option" publication by Kent Mfg. Sep. 21, 1989.

Primary Examiner—Randolph A. Reese
Assistant Examiner—Jeffrey L. Thompson
Attorney, Agent, or Firm—Litman, McMahon & Brown

[57] ABSTRACT

A shank assembly for mounting on a tool bar of a farm implement includes a first upper mount section firmly clamped to a tool bar at one end thereof and fixedly attached to a second lower section at the other end thereof. A ground working tool is fixedly attached to the lower section. The first section is wider than the second section providing strength to the assembly and lessening the likelihood of damage to the first section. The first section includes a generally transverse slot through which the second section extends. A nut and bolt arrangement fixedly attaches the first and second sections at a location near and generally above the slot.

2 Claims, 2 Drawing Sheets

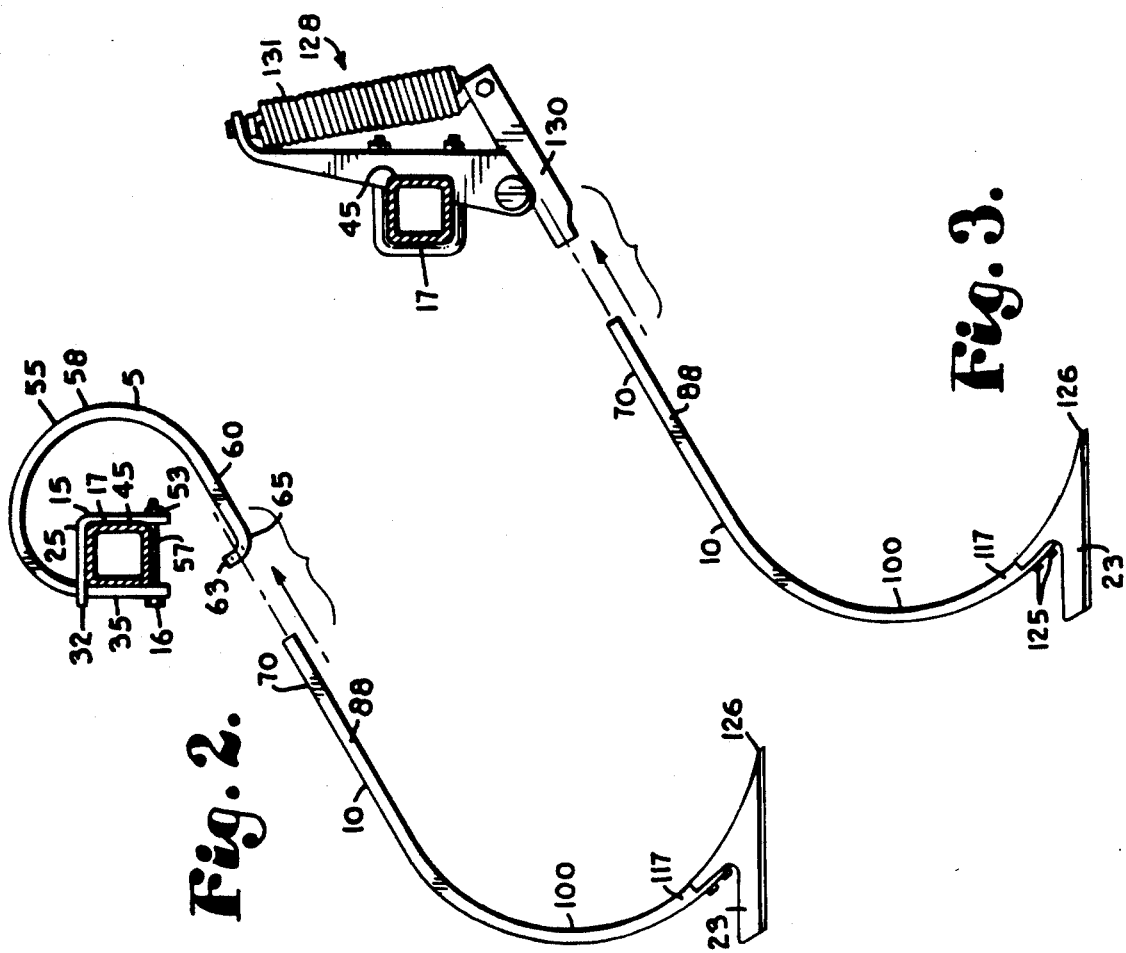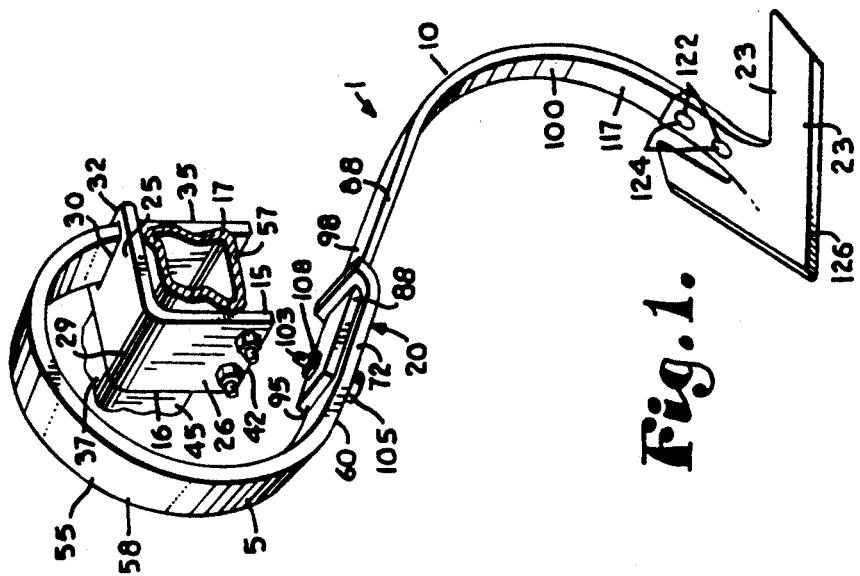

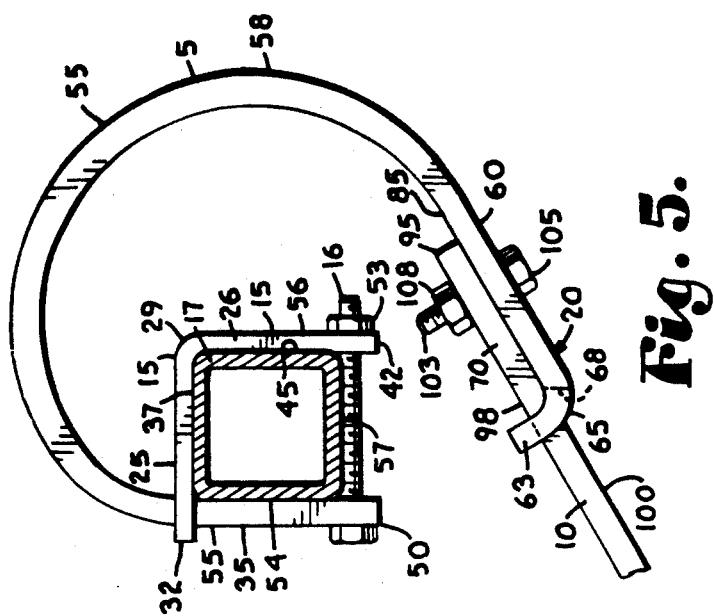
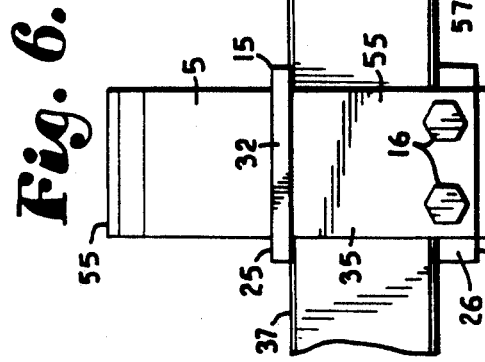
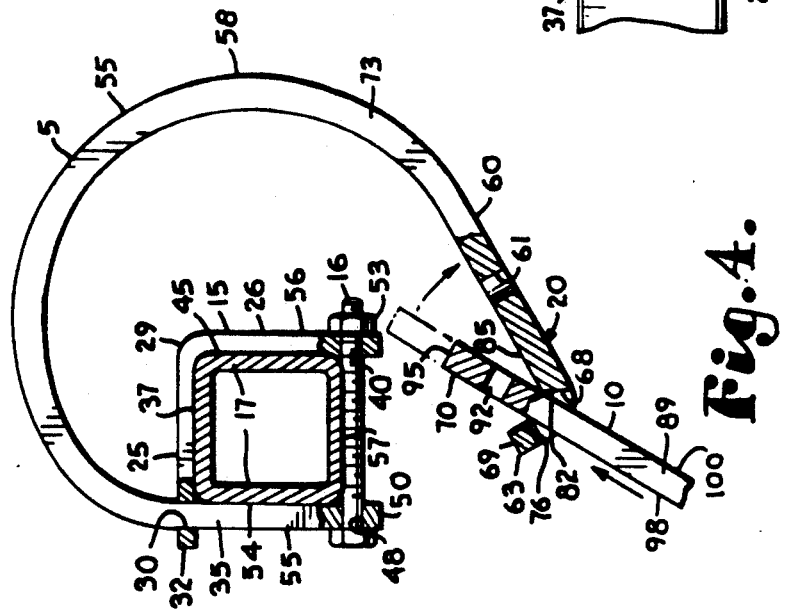

CULTIVATOR SHANK ASSEMBLY

BACKGROUND OF THE INVENTION

The present invention relates to agricultural cultivating tools and, more particularly, to a two-piece cultivator shank assembly.

For many years, cultivator shanks called "spring teeth" have been utilized for soil cultivation. In general, a spring tooth is a rigid, generally flat, curved shank to which a soil-working tool, such as a shovel, may be fixedly attached to a bottom end thereof. Such a shank is usually rigidly mounted on a tool bar of a farm implement. When the bottom of the shank encounters an obstruction, such as a rock or root, the shank resiliently deflects.

Spring teeth shanks presently utilized are typically of one-piece construction and produce adequate results under ideal working conditions. However, obstacles are often encountered that either break a spring tooth shank or bend the shank to such an extent that the shank is damaged and does not spring back into position, requiring either removal or repair of the shank so that the soil may be adequately cultivated. Conventional spring teeth also tend to fracture at the mounting end thereof, thus, there is a need for additional strength at the mounting end of each spring tooth shank.

The prior art includes shanks that are of two-ply construction, resulting in a thick shank having greater total strength than a single-ply shank but having the disadvantage of being heavier than traditional shanks and, therefore, less to likely easily trip out of the ground when an obstruction is encountered. Shanks have also been devised to include various shapes and curves at an upper portion near the mounting end thereof, providing adequate flexibility when an obstruction is confronted. However, if such shanks are broken or bent after an encounter with a substantial object, the entire shank, including the upper formed portion, must be replaced or repaired.

SUMMARY OF THE INVENTION

A cultivator shank assembly of the invention disclosed in this application is of two-piece construction having a first section firmly mounted to a tool bar of a farm implement and a second section fixedly attached to the first section at one end thereof and to a ground engaging tool at another end thereof. The first section is wider than the second section, providing strength and durability to the assembly at the mounting end where it is most needed. If a substantial obstacle is encountered by the assembly, the second, narrower section is more likely to break or bend, reducing the likelihood of damage to the first section. The second, narrower section is inexpensive to manufacture and may be easily removed and replaced if broken or damaged during use.

The first section includes a slot located near an end thereof through which a leg of the second section extends. The leg overlaps the first section and is attached thereto by a bolt and nut. The overlapping first and second sections also provide strength to the assembly. The slot in the first section closely receives the leg of the second section resulting in minimal lateral movement of the second section with respect to the first section.

The second section of the shank assembly is also adaptable for use with various types of tools such as a spring loaded clamping assembly for use in extremely rocky soil.

OBJECTS AND ADVANTAGES OF THE INVENTION

Therefore, the objects of the present invention are: to provide a cultivator shank assembly that is adapted to cooperate with a conventional farm implement tool bar; to provide such an assembly that is of two-piece construction; to further provide such an assembly wherein an upper mount section of the assembly is wider than and supports a narrower, lower section of the assembly; to further provide such an assembly wherein the width of the upper mount section provides strength at a mounting end of the assembly where greatest stress is likely to occur when the assembly encounters an obstruction; to further provide such an assembly wherein the lower section is easily detachable from the upper section; to provide such an assembly wherein the lower section may be used for other applications; to provide such an assembly wherein the upper mount section includes a slot through which an upper leg of the lower section extends, with the slot closely receiving the lower section, guarding against lateral movement of the lower section with respect to the upper mount section; to provide such a shank assembly that easily trips out of the ground when an obstacle s encountered; to further provide such a shank assembly that lessens the likelihood of damage to the upper mount section; to provide such an assembly wherein the lower section is inexpensive and easy to remove and replace; and to provide such an assembly that is relatively easy to use, inexpensive to construct and particularly well adapted for the intended usage thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a fragmentary, perspective view of a cultivator shank assembly according to the present invention, including an upper section and a detachable lower section with the upper section shown mounted on a tool bar and the lower section shown attached to an earth working tool.

FIG. 2 is an exploded, side elevational view of the shank assembly with the upper section mounted on a tool bar and the lower section shown detached from the upper section.

FIG. 3 is an exploded, side elevational view of the lower section of the shank assembly shown detached from a spring-loaded clamping mechanism that is mounted on a tool bar.

FIG. 4 is a fragmentary, side elevational view of the shank assembly, on a larger scale, shown with the upper section mounted on a tool bar and the lower section inserted through, but partially detached from, the upper section.

FIG. 5 is a fragmentary, side elevational view similar to FIG. 4 but shown with the upper section secured to the tool bar.

FIG. 6 is a fragmentary, rear elevational view of the shank assembly on the scale of FIG. 4, showing further details of the mounting arrangement between the upper and lower section.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in detail, a cultivator shank assembly of this invention, generally designated by the reference numeral 1, includes an upper or first section 5; a lower or second section 10; clamping means, such as illustrated by L-shaped bracket 15 and bolts 16, for mounting the assembly 1 on a tool bar 17 that constitutes one transverse member of a conventional farm implement mounting frame (not shown); fastening means, such as illustrated by an overlapping assembly generally designated by the reference numeral 20; and a ground engaging tool, as illustrated by shovel 23, for pulling through soil (not shown).

The first section 5 of the assembly 1 is fixedly attached to the tool bar 17 by the L-shaped bracket or clamp 15 and bolts 16. The L-shaped bracket has planar legs 25 and 26 joined at bend 29 in a right dihedral angle. Leg 25 has an elongated rectangular aperture or slot 30 located near and generally parallel to an edge 32. The slot 30 is sized to closely receive therethrough a straight planar portion 35 of the first section 5. The slot 30 is spaced from the bend 29 a distance slightly greater than the length of a top side 37 of the tool bar 17.

Leg 26 has a pair of spaced bolt-receiving apertures 40 located near an edge 42. The apertures 40 are spaced from the bend 29 a distance slightly greater than the height of a forward side 45 of the tool bar 17.

The portion 35 of first section 5 also has a pair of spaced bolt-receiving apertures 48 located near an edge 50. Portion 35 extends through slot 30 and is adjacent to a rearward side 54 of tool bar 17. The heads of bolts 16 abut against an outer flat surface 55 of portion 35 and bolts 16 extend through apertures 40 and 48 and are secured by nuts 53 that abut against an outer flat surface 56 of leg 26. Bolts 16 are adjacent to a bottom side 57 of tool bar 17. Portion 35, legs 25 and 26 and bolts 16 surround and fit snugly about tool bar 17 holding section 5 in place against side 54 and prohibiting any rotational or lateral movement of portion 35 of section 5 during use of the assembly 1.

It is foreseen that other types of clamping means may be utilized to fixedly attach or clamp portion 35 of section 5 to tool bar 17.

First section 5 is a generally flat, rectangular piece of constant cross-section that extends upwardly from the tool bar 17 at portion 35 and is formed into a generally C-shaped portion 58 arching in a forward direction about the tool bar 17 and extends downwardly and rearwardly to a generally straight portion 60 located generally below the tool bar 17 and slightly forwardly therefrom. Portion 60 has a bolt-receiving aperture 61 located centrally thereon.

An end piece 63 integral with the straight portion 60 is formed by a bend 65 in section 5. End piece 63 generally projects upwardly and rearwardly from portion 60 at an angle slightly greater than ninety degrees.

Section 5 includes an elongated slot 68 located at bend 65. The slot 68 is located generally transversely to the length of section 5, is generally parallel to edge 69 and is sized to receive therethrough a straight planar upper portion or leg 70 of the second section 10. Slot 68 is spaced centrally in bend 65 between edges 72 and 73 of section 5. Slot 68 is bounded by generally planar surfaces 76, 78, 80 and 82 of section 5. Surface 76 is generally parallel to a flat, inner planar surface 85 of straight portion 60 and generally perpendicular to surfaces 78 and 80. Surfaces 78 and 80 are generally parallel and are sized to closely receive edges 88 and 89 of the upper leg 70 of second section 10. Surface 82 is generally perpendicular to surfaces 78 and 80 and is spaced from surface 76 to provide adequate space for extending the upper leg 70 through slot 68.

Lower or second section 10 is also made of a generally flat, rectangular piece of constant cross-section similar to section 5, but of narrower width than section 5, allowing section 10 to fit within slot 68 of section 5. Both sections 5 and 10 are made from spring steel by conventional forming techniques.

Upper leg 70 of section 10 has a bolt-receiving aperture 92 located near an edge 95 thereof that extends between a flat upper surface 98 and flat lower surface 100 of section 10. Upper leg 70, together with aperture 92 and portion 60 of section 5, together with aperture 61 and elongate slot 68, make up the overlapping fastening assembly generally designated by reference numeral 20. When upper leg 70 is inserted in slot 68, upper leg 70 is placed adjacent to straight portion 60 of section 5 with apertures 61 and 92 aligned, and a bolt 103 is passed therethrough with a head 105 of bolt 103 abutting against flat surface 55 of portion 60 of section 5. A nut 108 is secured to bolt 103 and abuts surface 98 of upper leg 70 of section 10. Surface 98 of leg 70 also abuts against surface 76 and is wedged against surface 76 when bolt 103 and nut 108 secure upper portion or leg 70 to section 5. The frictional forces of surfaces 78 and 80 against edges 88 and 89, respectively, the frictional force of flat surface 100 against flat surface 85, and the frictional force of surface 76 against surface 98 hold leg 70 securely against section 5 and prevent rotational or lateral movement of leg 70 with respect to section 5. Corners 112 and 113 formed by the intersection of surface 76 with surfaces 78 and 80, respectively, are also slightly rounded so that leg 70 wedges securely between surfaces 78 and 80.

Leg 70 of section 10 extends downwardly and rearwardly from section 5 and tool bar 17. Section 10 then curves downwardly and forwardly from leg 70 to a position below and slightly behind tool bar 17. A lower, forwardly-extending portion 117 of section 10 includes two bolt-receiving apertures 120 for alignment with two bolt-receiving apertures 122 of shovel 23. Bolts 124 and nuts 125 secure the shovel 23 to the lower portion 117 with a shovel point 126 facing in a forward direction. It is foreseen that different types of ground-engaging tools may be secured to lower portion 117.

Section 10 of the shank assembly 1 may also be used to cooperate with other mounts, such as the spring-loaded clamping assembly 128 shown in FIG. 3. Upper leg 70 of section 10 is simply secured to a lower portion 130 of the spring-loaded clamping assembly 128 that is securely mounted on tool bar 17. A spring-loaded clamping assembly 128 is more expensive to build than the upper section 5 of the present invention but may be required for cultivation of particularly rocky soil. When the lower section 10 and ground-engaging tool 23 come in contact with a rock or other obstacle, spring 131 provides flexibility, allowing section 10 to easily trip out of the ground and quickly return to ground engagement once the obstacle is past.

In normal use, the shank assembly 1 as shown assembled in FIG. 1 is pulled through the soil with the point 126 of shovel 23 first. Sections 5 and 10 flex slightly due to the pull of soil about the shovel 23. When an obstacle is encountered, the assembly 1 deflects upwardly or slightly to either side. If the obstacle is large or otherwise substantial, the wider, stronger upper section 5 is adapted to remain intact with the narrower, less expensive lower section 10 more likely to stress and either break or bend.

If the lower section 10 is damaged, nut 108 is loosened and removed from bolt 103 and bolt 103 is removed from assembly 1. Upper leg 70 of section 10 is then slid in a rearward direction through slot 68 in section 5. Section 10 may either be repaired or a new section 10 acquired and slid forwardly through slot 68 and fixedly attached to section 5 by placing a bolt 103 through apertures 61 and 92 and securing section 10 to section 5 with a nut 108 screwed onto bolt 103.

It is to be understood that while certain forms of the present invention have been illustrated and described herein, it is not to be limited to the specific forms or arrangement of parts described and shown.

What is claimed and desired to be secured by Letters Patent is as follows:

1. A shank assembly for mounting a tool bar of an agricultural implement wherein the tool bar has a generally vertically oriented rearward side, comprising:
    (a) a first shank section formed in a generally C-shape and extending upwardly and forwardly about the tool bar; said section having a first planar portion, a second planar portion, a curved portion intermediately spaced between said first planar portion and said second planar portion, and a curved end piece projecting generally transversely to said second planar portion at an angle slightly greater than ninety degrees; said curved end piece spaced from the tool bar and first shank section having a generally rectangular transverse slot wherein said slot has a slot first side, a slot second side, and a pair of opposing slot ends; said slot having upper rounded corners disposed at junctures between said opposing slot ends and said slot first side;
    (b) an L-shaped bracket having first and second planar legs disposed at substantially a right dihedral angle; said bracket being adapted for mounting on the tool bar with said legs adjacent thereto; said first leg including a generally rectangular aperture closely receiving said planar portion of said first shank section;
    (c) a bolt adapted for mounting on the tool bar and located adjacent thereto; said bolt, in conjunction with said L-shaped bracket, fixedly attaching said first planar portion of said first shank section to said second leg and to the rearward side of the tool bar;
    (d) a second shank section of generally constant rectangular cross-section and having an upper portion, a lower portion, opposing second shank sides, and opposing second shank edges; said upper portion extending through said slot and fixedly attached to said first shank section near said curved end piece; said upper portion being of a shape and width such that one of said opposing second shank section sides frictionally engages said second planar portion, the other one of said opposing second shank section sides frictionally engages said slot first side, and said pair of opposing slot ends frictionally respectively engage said opposing second shank section edges such that said second shank section wedgedly engages said upper rounded slot corners, thereby securely retaining said second shank section with respect to said first shank section; said upper portion extending downwardly and rearwardly from said first shank section; said second shank section formed to curve in a forward direction with said lower portion located below the tool bar; and
    (e) a ground-engaging tool fixedly mounted to said lower portion.

2. A shank assembly for mounting a tool bar of an agricultural implement wherein the tool bar has a generally vertically oriented rearward side, comprising:
    (a) a first shank section formed in a generally C-shape and extending upwardly and forwardly about the tool bar; said section having a first planar portion, a second planar portion with upper and lower surfaces, a curved portion intermediately spaced between said first planar portion and said second planar portion, and a curved end piece projecting generally transversely to said second planar portion at an angle slightly greater than ninety degrees; said curved end place spaced from the tool bar and having a generally rectangular end slot wherein said slot has a slot first side, a slot second side, and a pair of opposing slot ends; said slot having upper rounded corners disposed at junctures between said opposing slot ends and said slot first side;
    (b) an L-shaped bracket having first and second planar legs disposed at substantially a right dihedral angle; said bracket being adapted for mounting on the tool bar with said legs adjacent thereto; said first leg including a generally rectangular aperture closely receiving said planar portion of said first shank section;
    (c) a bolt adapted for mounting on the tool bar and located adjacent thereto; said bolt, in conjunction with said L-shaped bracket, fixedly attaching said first planar portion of said first shank section to said second leg and to the rearward side of the tool bar;
    (d) a second shank section having a generally constant rectangular cross-section and having an upper portion, a lower portion, opposing second shank section sides, and opposing second shank section edges; said upper portion extending through said slot and fixedly attached to said first shank section near said curved end piece; said upper portion being of a shape and width such that one of said opposing second shank section sides frictionally engages said second planar portion, the other one of said opposing second shank section sides frictionally engages said slot second side, and said pair of opposing slot ends frictionally respectively engage said opposing second shank section edges such that said second shank section wedgedly engages said upper rounded slot corners, thereby securely retaining said second shank section with respect to said first shank section; said upper portion extending downwardly and rearwardly from said first shank section; said second shank section formed to curve in a forward direction with said lower portion located below the tool bar; and (e) a ground-engaging tool fixedly mounted to said lower portion, and (f) said slot second side forming an obtuse angle with said first shank section second planar portion upper surface such that insertion of aid second shank section through said slot is facilitated.

* * * * *